UNITED STATES PATENT OFFICE 2,580,738

N-SUBSTITUTED-2,5-DIMETHYL-2,5-DICYANOPYRROLIDINES

Peter L. de Benneville and James S. Strong, Philadelphia, Pa., assignors to Rohm & Haas Company, Philadelphia, Pa., a corporation of Delaware No Drawing. Application December 23, 1949, Serial No. 134,872

19 Claims. (Cl. 260—313)

This invention relates to N-substituted-2,5-dimethyl-2,5-dicyanopyrrolidines and to a method for their preparation. These compounds are useful as chemical intermediates, particularly in the pharmaceutical field. They are also useful as toxic agents in insecticidal compositions.

The reaction of cyanohydrins with ammonia usually leads to amino-nitriles. In the case of acetonylacetone cyanohydrin, however, we have found that ammonia does not react to yield the expected product. Furthermore, we have found that when a primary amine is used, diaminodinitriles are not formed, but, instead, N-substituted-2,5-dimethyl-2,5-dicyanopyrrolidines result.

Theoretically, the reaction appears to proceed as follows:

$CH_3COCH_2CH_2COCH_3 + 2HCN \longrightarrow$

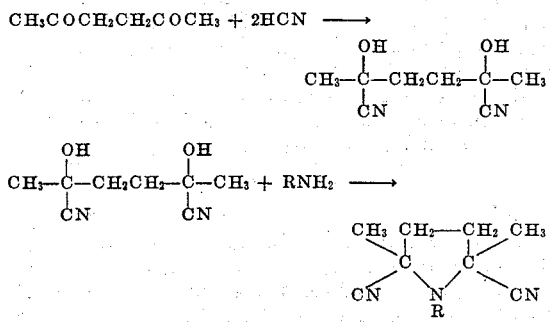

It is found, however, that the pyrrolidines are formed without regard to the exact order of combining the various reactants. Thus, acetonylacetone and hydrogen cyanide may first be reacted as above and primary amine then added. On the other hand, the reactants may all be mixed at the same time or the amine may be added to acetonylacetone and hydrogen cyanide then added. In any case the desired N-substituted-2,5-dimethyl-2,5-dicyanopyrrolidines are formed.

The amines which are useful include aliphatic, arylaliphatic, cycloaliphatic, and aryl primary amines. The amines may be mono-primary or di-primary amines which contain up to ten carbon atoms. The useful primary amines include such aliphatic amines as methylamine, ethylamine, propylamine, butylamine, amylamine, hexylamine, 2-ethylbutylamine, octylamine, caprylamine, 3,5,5-trimethylhexylamine, decylamine, allylamine, methallylamine, propargylamine, 2-ethylhexylamine, and isomers and homologues of these amines. Aliphatic amines are preferred in which the amino nitrogen is attached to a carbon atom which carries at least one hydrogen atom, as these give optimum yields of the desired products. Cycle-containing compounds which are useful include aniline, p-methylphenylamine, butylphenylamines, the naphthylamines, cyclohexylamine, methylcyclohexylamine, benzylamine, butylbenzylamine, cinnamylamine, phenylethylamine, hexahydrobenzylamine, beta-cyclohexylethylamine, and the like. The above amines may be summarized by the formula

where R' is a monovalent hydrocarbon group having not over ten carbon atoms. The mono-primary amines of this formula form a class of considerable interest, yielding monopyrrolidines.

The reaction of this invention is not confined, however, to monoprimary amines. It may also be effected with diprimary amines,

wherein R'' is a divalent hydrocarbon group of two to ten carbon atoms, at least two carbon atoms separating the primary amino groups. R'' may also be a divalent polyalkyleneamino group in which the carbon atoms occur in chains of at least two between nitrogen atoms.

Typical divalent groups for forming the diprimary amine include ethylene, propylene, trimethylene, butylene, hexamethylene, nonamethylene, and decamethylene, cyclohexylene, phenylene, and the like hydrocarbon groups, and polyalkyleneamino groups such as those from diethylenetriamine, dipropylenetriamine, triethylenetetramine, tetraethylenepentamine, N,N'-di(aminoethyl)propylenediamine, etc. These are of the general formula

where $n$ is an integer of at least two and $x$ is a number from zero to four.

Useful amines for purposes of the present invention may be summarized by the formula

where $m$ is an integer from one to two and R is a hydrocarbon group or a polyalkyleneamine group.

The reactions involving acetonylacetone, hydrogen cyanide, and primary amine are carried out in the liquid phase between 0° C. or lower and about 50° C. Since there is heat given out, the temperature of the reaction mixture is desirably controlled with the aid of a cooling coil or an external cooling bath.

Anhydrous liquid hydrogen cyanide is preferably used. Loss of this reactant may be minimized by use of an ice-cold condenser to reflux the hydrogen cyanide. The reaction of hydrogen cyanide and acetonylacetone is desirably catalyzed by the presence of a small amount of an alkali metal cyanide, such as potassium cyanide, or of an amine, preferably a tertiary amine, such as pyridine or triethanolamine, when the dicyanohydrin is to be first formed.

The reactions are desirably carried out in the presence of an inert organic solvent such as methyl alcohol or ethyl alcohol, ethyl ether, or isopropyl ether. There may also be used aqueous systems, even though these are less desirable than those using anhydrous organic solvents or organic solvents with limited amounts of water, as in the case of 95% ethyl alcohol or of ethyl ether.

The solvent may be removed by stripping under reduced pressure, by chilling to cause precipitation, by dilution of a water-miscible solvent with water, or by comparable steps for removing and/or precipitating or separating the products.

Typical methods for carrying out the reactions discussed above are shown in the following illustrative examples.

*Example 1.—Preparation of acetonylacetone dicyanohydrin*

A cold solution was prepared from 50 parts by weight of anhydrous ethyl ether and 37 parts by weight of anhydrous hydrogen cyanide. Three-tenths part of piperidine was added thereto to act as a catalyst. With this solution kept at about 10° C. by external cooling, there was slowly added 50 parts by weight of acetonylacetone. Hydrogen cyanide was refluxed gently in an ice-cold condenser. The mixture was stirred for an hour with the temperature allowed to rise. The reaction mixture was then stripped of solvent under reduced pressure without heating to yield 73.5 parts of acetonylacetone dicyanohydrin as a colorless paste. Addition of 1% of syrupy phosphoric acid may be made to stabilize the product.

The above example gives a typical preparation of acetonyldicyanohydrin. It will be evident that many variations in details can be made.

The following examples illustrate the conversion of acetonylacetone dicyanohydrin to the pyrrolidines of this invention.

*Example 2*

A solution was prepared from 7.75 parts of methylamine in 80 parts of methanol at 0°–5° C. Thereto was added in small portions 16.8 parts of acetonylacetone dicyanohydrin as prepared in Example 1. The reaction mixture was stirred and kept at 10° C. until solution of the cyanohydrin was complete. It was then stored in a refrigerator at 5°–10° C. for 48 hours. The reaction mixture was then subjected to reduced pressure and the solvent distilled off. There was obtained 12.5 parts of a crystalline solid which correspond in composition to N-methyl-2,5-dimethyl-2,5-dicyanopyrrolidine. The product had a neutralization equivalent of 182 (theory 184). It was recrystallized twice from methanol and then had a melting point of 79°–82° C. and a neutralization equivalent of 182.

*Example 3*

To 75 parts by weight of chilled methanol there was added 40 parts of anhydrous hydrogen cyanide and 0.5 part of piperidine. To this mixture there was then slowly added 57 parts of acetonylacetone. The mixture was kept below 35° C. with the aid of external cooling. The mixture was allowed to stand for a half-hour. Thereupon n-butylamine was added to a total of 40 parts by weight. The reaction temperature was held to 40° C. by cooling and by rate of addition. The reaction mixture was stirred for an hour. It was cooled in an ice-bath. Some crystals formed. Complete precipitation of product was effected by addition of ice. The product was collected by filtering. It amounted to 85 parts by weight. A nitrogen analysis by the Kjeldahl method indicated a nitrogen content of 19.7%, a result which is low due to loss of hydrogen cyanide when the sample is mixed with concentrated sulfuric acid. Nitrogen analysis by the Dumas method gives the theoretical result, 20.4%, for N-butyl-2,5-dimethyl-2,5-dicyanopyrrolidines. The product melted at 42°–43° C.

*Example 4*

The procedure of Example 3 was followed with substitution of an equivalent weight of 3,5,5-trimethylhexlamine for the butylamine. The product obtained was N-nonyl-2,5-dimethyl-2,5-dicyanopyrrolidine. It melted at 54°–56° C.

In the same way and equivalent weight of decylamine was reacted with acetonylacetone dicyanohydrin in isopropanol. The mixture was held at 50° C. for four hours with stirring. The mixture was cooled in an ice-bath and the crystals which separated were filtered off. They corresponded in composition to N-decyl-2,5-dimethyl-2,5-dicyanopyrrolidine.

In the same way other N-aliphatic hydrocarbon-substituted pyrrolidines of this type can be prepared. It should be noted that the N-substituent may be an alkyl group as above or an unsaturated aliphatic hydrocarbon group, such as allyl, alpha-methallyl, crotyl, or the like. The preparation of N-allyl-2,5-dimethyl-2,5-dicyanopyrrolidine is typical of this subclass of compounds. Equivalent weights of methallylamine or crotylamine can be substituted for the allylamine in the following example to give the corresponding N-substituted compounds.

*Example 5*

(a) A solution of acetonylacetone dicyanohydrin was prepared by the dropwise addition of 342 parts of acetonylacetone to a cooled solution of 189 parts of anhydrous hydrogen cyanide in 318 parts of methanol in the presence of 2 parts of piperidine. The reaction mixture was cooled by an external ice-bath so as to maintain gentle refluxing in a condenser which was cooled with ice-water. When reaction was complete, there was added to the reaction mixture 3.7 parts by weight of 85% phosphoric acid. This solution of acetonylacetone dicyanohydrin in methanol was stored in a refrigerator until needed for reaction with an amine. It was found that this solution was a satisfactory one for the formation of the desired heterocyclic compounds.

(b) To 56.4 parts of this solution cooled to 0° C. there was added with stirring over a thirty-minute period 11.4 parts of allylamine in small portions. The resulting mixture was allowed to stand for three hours at room temperature. It was then poured onto ice. A clear, yellow oil formed. It was separated with the aid of ethyl ether. The ether solution was dried over calcium chloride and stripped under reduced pressure without being warmed. There was thus obtained 33 parts of a mobile yellow liquid which corresponded by analysis to N-allyl-2,5-dimethyl-2,5-dicyanopyrrolidine. The nitrogen content was 21.8% (theory 22.4%) by the Kjeldahl method.

Example 6

To 70 parts of chilled methanol was added 34 parts of chilled hydrogen cyanide and 0.6 part of piperidine. While this mixture was held at 0°–10° C. with the aid of an ice-bath, 57 parts of acetonylacetone was slowly added and this mixture stirred for an hour. Then 50 parts of cyclohexylamine was added with cooling and the reaction mixture stirred for an hour without cooling. The solution was then stripped at low pressure to give a material which became solid. The crude product amounted to 128.5 parts. It was recrystallized from aqueous methanol to give 119 parts of product corresponding in composition to N-cyclohexyl-2,5-dimethyl-2,5-dicyanopyrrolidine. The product melted at 106°–107° C. and contained 18.2% of nitrogen (theory 18.2%).

Example 7

To 35 parts of cold methanol were added chilled anhydrous hydrogen cyanide, 0.6 part of piperidine, 28.5 parts of acetonylacetone, and 25 parts of cyclohexylamine in rapid succession. The only precaution taken was to keep the temperature of the reaction mixture below 25° C. The mixture was poured over cracked ice. A solid formed in about a half-hour and, when precipitation was complete, was separated. This product melted at 105° C. and corresponded in composition to N-cyclohexyl-2,5-dimethyl-2,5-dicyanopyrrolidine.

Example 8

There were mixed in the cold 35 parts of water, 17 parts of hydrogen cyanide, 25 parts of cyclohexylamine, and 28.5 parts of acetonylacetone. After the mixture had been stirred for a half-hour, ice was added. A gummy precipitate formed which became hard when stored in a refrigerator. The mixture was diluted with water and filtered. The solid material was recrystallized from methanol to give a product melting at 105°–106° C. It corresponded in composition to N-cyclohexyl-2,5-dimethyl-2,5-dicyanopyrrolidine.

Example 9

To 70 parts of chilled methanol was added 34 parts of cold hydrogen cyanide and 0.3 part of triethanolamine. With this mixture cooled with an ice-bath there was added 57 parts of acetonylacetone. The mixture was stirred for an hour, whereupon 47 parts of aniline was added. Stirring was continued for an hour after the addition had been completed. The reaction mixture was stripped without heating under low pressure. A residue of 50 parts of N-phenyl-2,5-dimethyl-2,5-dicyanopyrrolidine was obtained. It melted at 63°–66° C. and contained by analysis 18.7% of nitrogen (theory 13.7%).

Example 10

To 150 parts of cold methanol there were added 68 parts of cold hydrogen cyanide, 0.5 part of piperidine, and 114 parts of acetonylacetone. The temperature of the reaction mixture was not allowed to exceed 45° C. This reaction mixture was left standing for two hours. Then 118 parts of benzylamine was added with the temperature of the mixture maintained at 40°–45° C. The reaction mixture was left standing for an hour and cooled in an ice-bath. Crystals formed and were filtered off to give 199 parts of product. The filtrate was treated with cold water. A precipitate was formed and was separated by filtration. This material amounted to 37 parts and was found to be of the same composition as the crystalline product. The product was identified as N-benzyl-2,5-dimethyl-2,5-dicyanopyrrolidine. It melted at 88°–89° C.

Example 11

To a mixture of 70 parts of cold methanol, 35 parts of hydrogen cyanide, and 0.5 part of piperidine was slowly added with cooling 57 parts of acetonylacetone. Stirring was continued for a half-hour and then there was added 15 parts of ethylenediamine in small portions. After about half of this amine had been added, the product began to separate. When addition of amine was complete, the mixture was allowed to stand for an hour. The reaction mixture was then filtered to give 55 parts of product. An additional yield of 8.5 parts was obtained by dilution of the filtrate with water. The product obtained melted at 166°–167° C., contained 26% of nitrogen (theory 25.9%), and was identified as N,N'-bis(2,5-dimethyl-2,5-dicyanopyrrolidino)ethane.

Example 12

Substitution of 19 parts of propylenediamine for the ethylenediamine of Example 11 leads to the preparation of a solid product which crystallizes from solution. It corresponds in composition to N,N' - (bis - 2,5 - dimethyl - 2,5 - dicyanopyrrolidino)-1,2-propane, containing 24.9% of nitrogen (theory 24.84%) and melting at 160°–162° C.

Example 13

A methanol solution of acetonylacetone dicyanohydrin was prepared as described in Example 5a. To 71 parts of this solution there was added 13.5 parts of p-phenylenediamine. Slight warming was used to dissolve this amine. The resulting solution was then stored in the refrigerator. A crystalline product formed. It was separated by filtration to yield 21.5 parts of a crystalline product melting at 82° C. The analysis of the product established that it was N,N'-phenylene-bis-2,5-dimethyl-2,5-dicyanopyrrolidine.

In the same way other di-primary amines react to give comparable bis compounds.

Example 14

To 71 parts of the methanol solution of acetonylacetone dicyanohydrin prepared in Example 5a there was added 14.5 parts of hexamethylenediamine. The mixture was at first a clear solution, but on standing an oil formed therein. It was recovered by adding the mixture to water and separating the oil with the aid of ether. The organic layer was dried over calcium sulfate and stripped under reduced pressure to give a clear yellow oil. This material gave the correct analysis for N,N'-hexamethylene-bis-2,5-dimethyl-2,5-dicyanopyrrolidine or N,N'-bis(2,5-dimethyl-2,5-dicyanopyrrolidino)ethane.

In the same way any alkylene diamine reacts to form the corresponding N,N'-alkylene-bis-2,5-dimethyl-2,5-dicyanopyrrolidine. These are generally oils.

The N - substituted-2,5-dimethyl-2,5-dicyanopyrrolidines are potent toxicants for use in insecticidal compositions. Their effectiveness was shown in a series of tests by the approved Peet-Grady method with houseflies. Solutions containing 2% of one of various pyrrolidines of this invention were made in deodorized kerosene and the effectiveness thereof determined in comparison with the Official Test Insecticide (OTI). Results for the N-methyl-, N-cyclohexyl-, N-phenyl-, and N-benzyl-2,5-dimethyl-2,5-dicyanopyrrolidines are summarized in Table I, the respective compounds being identified by reference to their N-substituents.

TABLE I

*Peet-Grady evaluation*

| Compound | Methyl | Cyclohexyl | Phenyl | Benzyl |
|---|---|---|---|---|
| Knockdown Per Cent | 100 | 100 | 100 | 100 |
| Kill (v. OTI) | +16 | +38 | +60 | +18 |

These same compounds were dispersed with octylphenoxy polyethoxyethanol and applied in a dispersion in an aqueous spray to bean plants infested with the black bean aphid. Counts were made 24 hours later. Results are summarized in Table II.

TABLE II

*Kill of bean aphids with compounds diluted 1:400 in aqueous sprays*

| Compound | Methyl | Cyclohexyl | Phenyl | Benzyl |
|---|---|---|---|---|
| Kill Per Cent | 69 | 98 | 55 | 90 |

Dusts were prepared in which the pyrrolidines were dispersed with a solid carrier, such as talc and diatomaceous earth. The active agent was adjusted to 5%. These dusts were applied to bean plants infected with aphids. The kills obtained were similar to those reported in Table II.

We claim:

1. A process for preparing N-substituted-2,5-dimethyl-2,5-dicyanopyrrolidines which comprises reacting together hydrogen cyanide, acetonylacetone, and a primary amine of the formula $$R(NH_2)_m$$

where R is a hydrocarbon group of not over ten carbon atoms and m is an integer from one to two.

2. A process for preparing N-hydrocarbon-substituted - 2,5 - dimethyl - 2,5 - dicyanopyrrolidines which comprises reacting hydrogen cyanide with acetonylacetone and reacting the resulting product with a primary amine of the formula $$R(NH_2)_m$$

where R is a hydrocarbon group of not over ten carbon atoms and m is an integer from one to two.

3. A process for preparing a compound of the formula

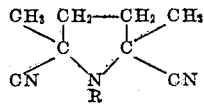

which comprises reacting acetonylacetone dicyanohydrin with a primary amine RNH2, where R is a monovalent hydrocarbon group of not over ten carbon atoms.

4. The process of claim 3 wherein the hydrocarbon group is an alkyl group.

5. The process of claim 4 wherein the alkyl group is methyl.

6. The process of claim 3 wherein the hydrocarbon group is the benzyl group.

7. The process of claim 3 wherein the hydrocarbon group is a phenyl group.

8. A process for preparing N,N'-(bis-2,5-dimethyl - 2,5 - dicyanopyrrolidino)alkanes which comprises reacting acetonylacetone dicyanohydrin with a diprimary amine, NH2R''NH2, wherein R'' is a divalent hydrocarbon group of not over ten carbon atoms with at least two carbon atoms between the nitrogen atoms.

9. The process of claim 8 wherein the divalent hydrocarbon group is an alkylene group of two to ten carbon atoms.

10. The process of claim 9 wherein the alkylene group is the ethylene group.

11. A new chemical compound of the formula

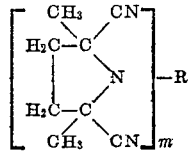

wherein m is a whole number from one to two and R is a hydrocarbon group of not over ten carbon atoms.

12. As new chemical compounds, N-hydrocarbon-substituted-2,5 - dimethyl - 2,5-dicyanopyrrolidines, in which the hydrocarbon substituent contains not over ten carbon atoms.

13. As new chemical substances, compounds of the formula

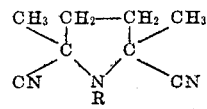

wherein R is an aliphatic hydrocarbon group of not over ten carbon atoms.

14. The compounds of claim 13 wherein the aliphatic hydrocarbon group is alkyl.

15. The compound of claim 14 wherein the alkyl group is methyl.

16. A new chemical compound of the formula

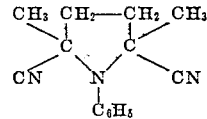

17. A new chemical compound of the formula

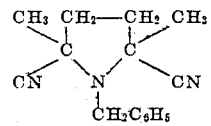

18. As new chemical substances, compounds of the formula

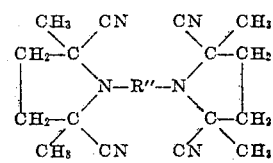

wherein R'' is an alkylene group of two to ten carbon atoms, at least two of which occur between nitrogen atoms.

19. As a new chemical compound, N,N'-bis(2,5-dimethyl-2,5-dicyanopyrrolidino)ethane.

PETER L. DE BENNEVILLE.
JAMES S. STRONG.

REFERENCES CITED

The following references are of record in the file of this patent:

UNITED STATES PATENTS

| Number | Name | Date |
|---|---|---|
| 2,497,839 | Ralston | Feb. 14, 1950 |